US008929587B2

(12) United States Patent
Izzat et al.

(10) Patent No.: US 8,929,587 B2
(45) Date of Patent: Jan. 6, 2015

(54) MULTI-TRACKING OF VIDEO OBJECTS

(75) Inventors: Izzat H. Izzat, Santa Clarita, CA (US);
Mike A. Derrenberger, Hopkinton, MA (US)

(73) Assignee: Thomson Licensing,
Boulogne-Billacourt (FR)

(*) Notice: Subject to any disclaimer, the term of this patent is extended or adjusted under 35 U.S.C. 154(b) by 825 days.

(21) Appl. No.: 12/226,702

(22) PCT Filed: May 31, 2006

(86) PCT No.: PCT/US2006/020728
§ 371 (c)(1),
(2), (4) Date: Oct. 24, 2008

(87) PCT Pub. No.: WO2007/139544
PCT Pub. Date: Dec. 6, 2007

(65) Prior Publication Data
US 2009/0103775 A1    Apr. 23, 2009

(51) Int. Cl.
*G06K 9/00* (2006.01)
*G06T 7/20* (2006.01)

(52) U.S. Cl.
CPC ........... *G06T 7/20* (2013.01); *G06T 7/2046* (2013.01); *G06T 2207/10016* (2013.01); *G06T 2207/30268* (2013.01)
USPC ........................................................ 382/103

(58) Field of Classification Search
USPC ............. 382/103, 104, 107; 707/3, 103, 100
See application file for complete search history.

(56) References Cited

U.S. PATENT DOCUMENTS

| 7,200,266 | B2* | 4/2007 | Ozer et al. | 382/173 |
| 7,447,332 | B2* | 11/2008 | Horii et al. | 382/103 |
| 7,702,592 | B2* | 4/2010 | Taylor | 705/71 |
| 7,903,882 | B2* | 3/2011 | Nagasaka | 382/224 |
| 7,957,565 | B1* | 6/2011 | Sharma et al. | 382/115 |
| 8,009,897 | B2* | 8/2011 | Xu et al. | 382/154 |
| 2002/0181741 | A1* | 12/2002 | Masukura et al. | 382/103 |
| 2003/0228031 | A1* | 12/2003 | Rhoads | 382/100 |
| 2004/0131254 | A1* | 7/2004 | Liang et al. | 382/181 |

(Continued)

FOREIGN PATENT DOCUMENTS

| EP | 0666545 | 9/1995 |
| JP | 2003032544 | 1/2003 |
| JP | 200446647 | 2/2004 |

(Continued)

OTHER PUBLICATIONS

Du et al.: "A Color Projection for Fast Generic Target Tracking," Proceedings of the 1995 IEEE/RSJ International Conference on Intelligent Robots and Systems, vol. 1, Aug. 5, 1995, pp. 360-365, XP000740914.

(Continued)

*Primary Examiner* — Nancy Bitar
(74) *Attorney, Agent, or Firm* — Robert D. Shedd

(57) ABSTRACT

An inventive method for video object tracking includes the steps of selecting an object; choosing an object type for the object, and enabling one of multiple object tracking processes responsive to the object type chosen. In a preferred embodiment selecting the object includes one of segmenting the object by using a region, selecting points on the boundary of an object, aggregating regions or combining a selected region and selected points on a boundary of an object. The object tracking processes can be expanded to include tracking processes adapted to newly created object types.

7 Claims, 2 Drawing Sheets

(56) References Cited

U.S. PATENT DOCUMENTS

| | | | |
|---|---|---|---|
| 2005/0232465 A1* | 10/2005 | Braune et al. | 382/103 |
| 2008/0120129 A1* | 5/2008 | Seubert et al. | 705/1 |
| 2010/0034425 A1* | 2/2010 | Lin et al. | 382/103 |
| 2010/0278450 A1* | 11/2010 | Derrenberger et al. | 382/284 |
| 2010/0296697 A1* | 11/2010 | Ikenoue | 382/103 |
| 2011/0241493 A1* | 10/2011 | Koizumi et al. | 310/363 |

FOREIGN PATENT DOCUMENTS

| | | |
|---|---|---|
| JP | 2006031245 | 2/2006 |
| WO | WO2005034422 | 4/2005 |
| WO | WO2005050907 | 6/2005 |
| WO | WO 2006/000123 A1 | 1/2006 |

OTHER PUBLICATIONS

Zhi et al, "Interactive Video Object Segmentation: Fast Seeded Region Merging Approach," Electronics Letters, IEEE Stevenage, GB, vol. 40, No. 5, Mar. 4, 2004, pp. 302-304, XP006021581.

Tan et al.: "Model-Based Localisation and Recognition of Road Vehicles," International Journal of Computer Vision, vol. 27, No. 1, Mar. 1998, pp. 5-25, XP000765201.

Pingali et al.: "Real Time Tracking for Enhanced Tennis Broadcasts," Proceedings of the 1998 IEEE Computer Society Conference on Computer Vision and Pattern Recognition, CVPR, Santa Barbara, CA Jun. 23-25, 1998, pp. 260-265, XP000871506.

The International Search Report, dated Mar. 28, 2007.

* cited by examiner

MULTI-TRACKING OF VIDEO OBJECTS

This application claims the benefit, under 35 U.S.C. §365 of International Application PCT/US2006/020728, filed on May 31, 2006, which was published in accordance with PCT Article 21(2) on Dec. 6, 2007, in English.

FIELD OF THE INVENTION

The present invention generally relates to segmenting and tracking of video objects and more particularly to multi-tracking video objects.

BACKGROUND OF THE INVENTION

Segmenting and tracking of video objects has many applications in computer vision, and video-processing applications such as object based coding and video post-production. Current segmentation and tracking of video objects involve object segmentation, in the first video frame, followed by tracking the object in the following frames. The tracking depends on the segmentation method used to segment the first frame.

Current segmentation techniques are either region based, boundary-based or a combination of region and boundary techniques. Region based segmentation groups pixels into regions based on their proximity and homogeneity. The region-based segmentations produce grouping by split and merge until a certain criteria is satisfied. Region based algorithms tend to over segment the object and has difficulty with complex textured objects. Boundary based segmentation tracks the boundary of the object in, for example, it maps a curve on the object boundary. The boundary-based methods do not take into account the content of the object. These methods require good initial contour processing and have problems with separate regions wholly contained within the region boundary. Combinations of region and boundary segmentation techniques restrict region growing near an object boundary. In general, the region and boundary combination techniques produce good results but are time consuming. Current tracking algorithms highly depend on the segmentation method used in the first frame. With region based segmentation tracking consists of estimating the motion of the region in the following frames. If boundary or curve based segmentation is used, the tracking consists of finding the curve location in the following frames.

Current segmentation and tracking of video objects do not take advantage of the knowledge of the object type. These segmentation and tracking techniques have limited functionality and work only for a certain class of objects. Many of the current approaches are semi-automatic in that they require the user to identify the object of interest and to manually correct inaccuracies.

SUMMARY OF THE INVENTION

An inventive method for video object tracking includes the steps of selecting an object; associating an object type for the object, and enabling one of multiple object tracking processes responsive to the associated object type. In a preferred embodiment selecting the object includes one of segmenting the object by using a region, selecting points on the boundary of an object; aggregating regions or combining a selected region and selected points on a boundary of an object. The object tracking processes can be expanded to include tracking processes adapted to newly created object types.

In an alternative embodiment of the invention, a method of video object tracking includes the steps of selecting an object from a video scene, defining an object type for the object, and selecting one of a plurality of object tracking responsive to the object type defined.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The inventive segmentation and tracking of an object in video post-production and other applications improves performance by implementing a number of algorithms. A different algorithm is used for each common object type such as a human face or a car. Each algorithm takes advantage of the knowledge of the object type to improve the segmentation and tracking performance of the system. If the object of interest is not included in the list, the system implements a default general-purpose algorithm. The inventive approach is adaptive in nature in that new algorithms can be added as more common objects are identified. The invention is a significant improvement over the limitations of existing object segmentation and tracking that has been directed toward tracking a segmented region with uniform features instead of on a complete video object.

Figure 1:
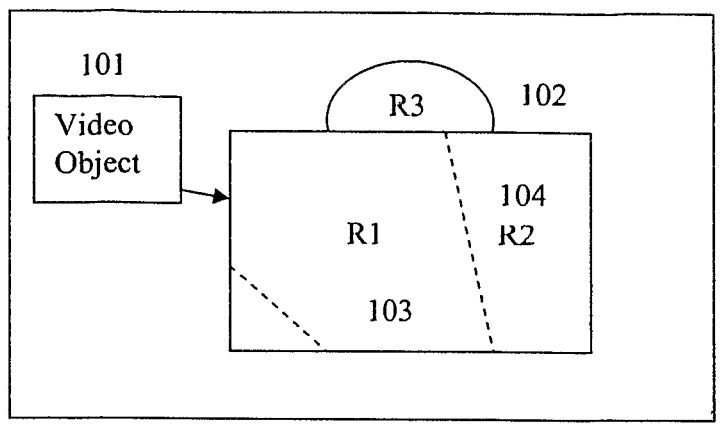
FIG. 1 shows a video object divided into multiple regions in accordance with the invention.

Referring to the diagram 100 of FIG. 1, a video object 101 is segmented into multiple R1, R2 and R3 regions 103, 104 and 102. In addition to identifying the object to be tracked, the type of the object is a required input by the user at the beginning of the process.

Figure 2:
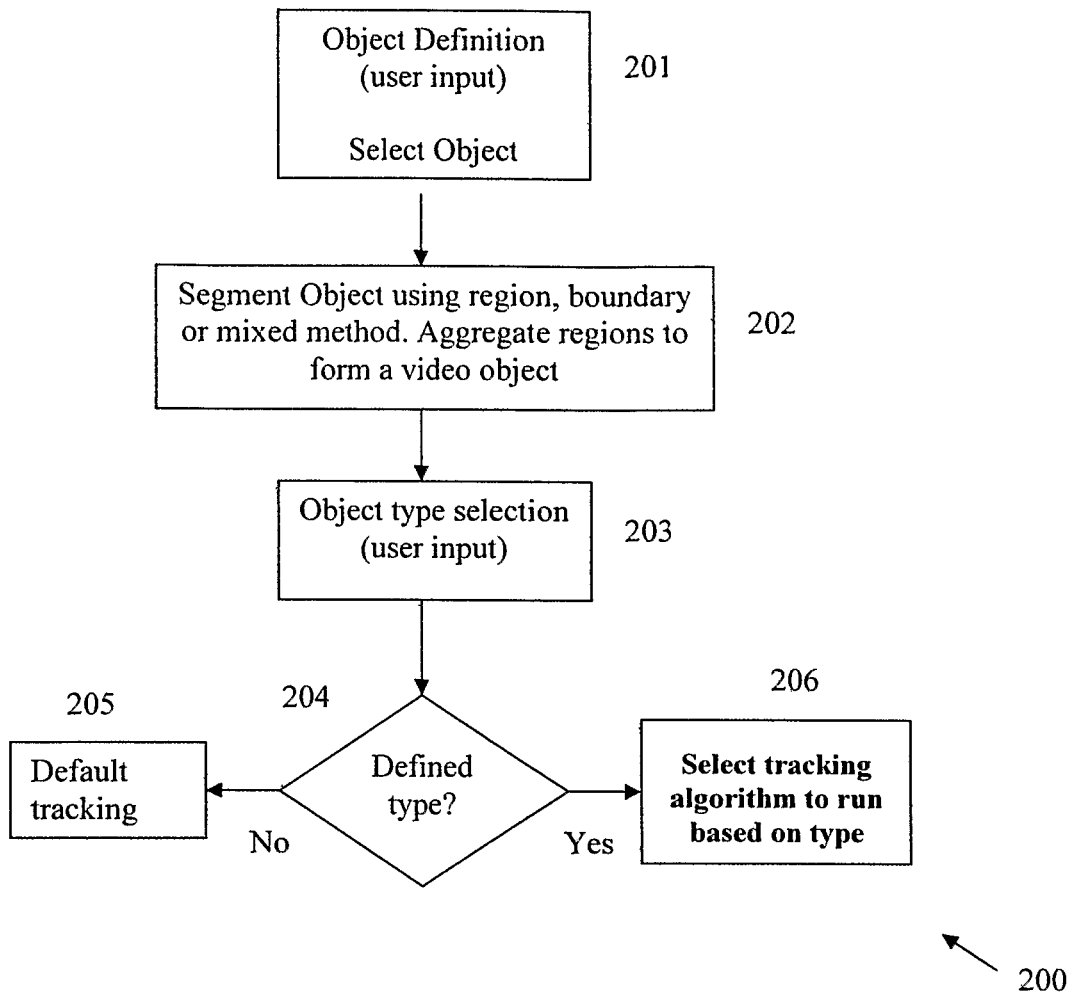
FIG. 2 is a diagram of the process of multiple object, segmentation and tracking algorithms in accordance with the invention.

A flowchart 200 of the inventive process is shown in FIG. 2. In the figure, the object to be tracked is identified or selected by the user by 201. The user segments the object by using a region, selecting points on the boundary of the object, a mixture of regions and boundaries or aggregate regions to form a video object 202. For example, a selection of points can be used to create a contour around the object to be tracked. The user further identifies the type of the object 203 from, for example, a pull down list. The list can include objects commonly tracked in post-production such as humans. If the object type is not on the list 204, the proposed method uses a general-purpose method for tracking the segmented object 205. Otherwise, a tracking algorithm based on the object type is used 206.

In addition to providing the type of the object to be tracked, the user may also provide additional clues to better aid the tracking process. For example, the operator may provide the orientation of the selected object by selecting salient features on both the video and the object type model. As another example, the user may provide the characteristic of the reflected surface and some of the distortion transformation that could occur to improve tracking of the object reflection.

In many cases tracking of an object may be aided by tracking a second object in the scene. Tracking multiple objects can be useful since objects to be tracked often exist in close proximity to other objects. Tracking multiple objects is more difficult to implement since objects can touch, occlude and interact with others, and can enter or leave the image. The user can select a second object to track. The user can also provide information about the occluding object characteristic if any. This makes tracking easier and produces better tracking results.

Figure 3:
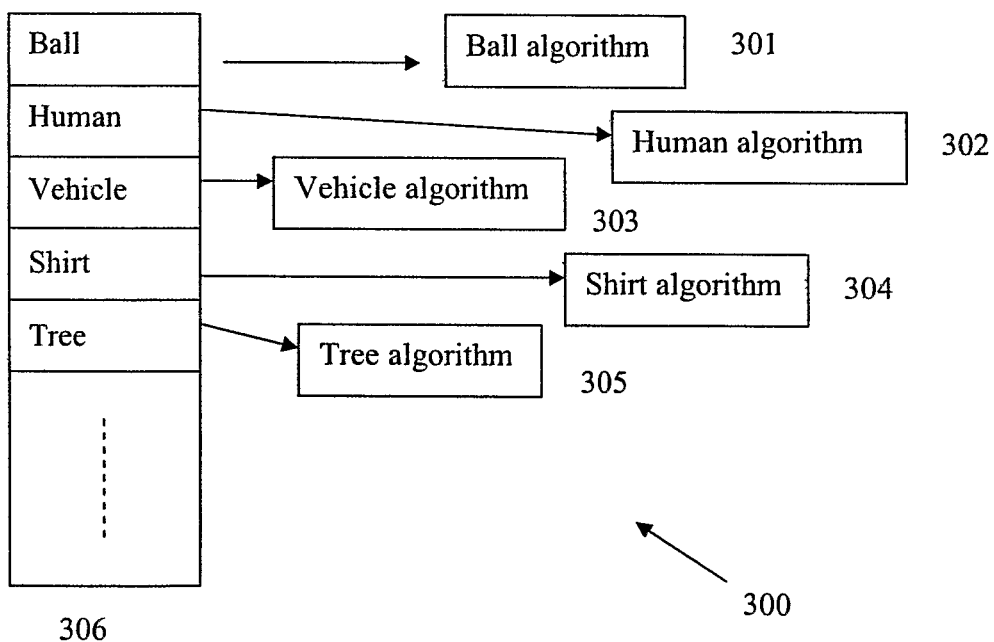
FIG. 3 is a diagram showing how each video object triggers a separate tracking algorithm in accordance with the invention.

Once the user selects an object from an object tracking list 306 and provides any appropriate additional information, a new tracking algorithm will be triggered as shown by the diagram 300 in FIG. 3. Exemplary ball 301, human 302, vehicle 303, shirt 304 and tree 305 algorithms shown are illustrative of the variety and adaptive nature of the inventive object segmentation and tracking. The invention takes advantage of the object type to perform more accurate object tracking. The types of objects to be tracked can be simple such as a ball or more complex such as a vehicle. For a subclass of complex objects, three dimensional 3D models can be used to aid the tracking. The 3D model can be used to describe both the geometry of the object and possible dynamic properties of the object such as its motion.

The system allows new object types to be added to the list as needed, making it adaptive to changing or adding new video object types to be segmented and tracked. For example, as new techniques become more available to track deformable surfaces, such as a shirt, a new object type and algorithm can be added.

The invention takes advantage of the object type to improve segmentation accuracy. Additional user input is needed but is not a major burden. The computation demands of the invention are simple since one and only one object tracking algorithm is triggered per object. The inventive process allows dynamic linking of object tracking algorithms to improve efficiency and to allow new types to be easily added as needed.

Although the invention is discussed mainly in the context of a video stream, the inclusion of depth information can significantly improve the result of the object tracking. Three dimension 3D information about an object to be tracked enables rapid development of 3D models and more accurate processing of images. Depth information can be obtained at acquisition time using, for example, laser or stereo images. It can also be obtained with some success from 2D images.

The invention is directed to a model-based approach to object segmentation and tracking. The inventive approach requires limited interaction from the user in identifying the object. The invention requires that the user identify the type of object to be tracked from a list of possible objects. The list is created from the most common objects such as human, car, face, etc. More objects can be modeled and added to the list as needed. Selecting a certain object type will trigger an algorithm that takes advantage of the knowledge of the object type to improve the accuracy of segmenting and tracking the object.

Having described preferred embodiment for the multi-tracking approach to object segmentation and tracking in a video stream application, it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A method comprising the steps of:
selecting a video scene from a video stream;
dividing the video scene into a plurality of regions;
forming a second video object by combining selected regions of said plurality of regions in said video scene;
associating without user input an object type of a plurality of object types to the video object; and based on and responsive to the object type associated with the video object, enabling one of a plurality of object tracking processes for processing the video object, Wherein each object tracking process of said plurality of object tracking processes is associated with a particular object type that is different from the object types associated with other object tracking processes of said plurality of object tracking processes; choosing the object type from a list of known object types related to the video object and using a general purpose object tracking process to process an object type that is not identified in the list of known object types.

2. The method of claim 1, further comprising the steps of:
selecting points on a boundary of an object, within the video scene; and
combining a selected region and selected points on a boundary of an object to form the video object.

3. The method of claim 2, further comprising the step of:
selecting points to create a contour around an object to be tracked.

4. The method of claim 1, further comprising the step of:
expanding the plurality of object tracking process to include an object tracking process for a previously unidentified object type.

5. The method of claim 1, further comprising the step of:
including, in said plurality of object tracking processes, at least one object tracking process for an object type selected from a group consisting of a ball object, human object, vehicle object, shirt object and tree object.

6. The method of claim 1, further comprising the steps of:
selecting multiple video objects and enabling respective object tracking processes for each of the multiple video objects.

7. The method of claim 1, further comprising the step of:
associating an object type based on geometry and dynamic properties of the second video object.

\* \* \* \* \*